9/1/87 XR 4,691,137

United States Patent [19]

Goto et al.

[11] Patent Number: 4,691,137

[45] Date of Patent: Sep. 1, 1987

[54] ELECTRODE PLATE FOR GENERATING PLASMA

[75] Inventors: Tokuju Goto, Nara; Itsuo Tanaka, Osaka; Yoshikazu Sando; Hiroshi Ishidoshiro, both of Wakayama, all of Japan

[73] Assignee: Sando Iron Works Co., Ltd., Japan

[21] Appl. No.: 784,804

[22] Filed: Oct. 4, 1985

[30] Foreign Application Priority Data

Oct. 5, 1984 [JP] Japan ................................ 59-150961
Oct. 5, 1984 [JP] Japan ................................ 59-150962

[51] Int. Cl.⁴ .......................... H01J 7/24; B23K 9/00; B08B 3/12

[52] U.S. Cl. ............................... 313/30; 219/121 PN; 68/5 E

[58] Field of Search ...................... 313/292, 231.4, 30, 313/39; 68/5 E; 219/121 PN, 121 PR, 121 PM

[56] References Cited

U.S. PATENT DOCUMENTS 3,586,905 6/1971 Bignell ........................ 313/231.41 X
4,507,539 3/1985 Sando et al. ...................... 68/5 E X

*Primary Examiner*—Palmer C. DeMeo
*Assistant Examiner*—Sandra L. O'Shea
*Attorney, Agent, or Firm*—Toren, McGeady & Associates

[57] ABSTRACT

An electrode plate for generating low temperature plasma comprising a plurality of long electrode plate members with the same form, a plurality of cooling water passages, which serve simultaneously as support members, for connecting each pair of the adjacent electrode plate members respectively along their longitudinal direction with a cooling water passage therebetween so as to arrange the adjacent electrode plate members alternately up and down in parallel with no formation of a projection, and cooling water communicating pipes provided outside the electrode plate members.

By arranging a pair of the present inventive electrode plates up and down in parallel and supplying high frequency electric current thereto, low temperature plasma can be generated uniformly and effectively all over the electrode plates.

3 Claims, 5 Drawing Figures

ELECTRODE PLATE FOR GENERATING PLASMA

FIELD OF THE INVENTION AND RELATED ART STATEMENT

The present invention relates to an electrode plate for generating low temperature plasma in an apparatus to treat a cloth with low temperature plasma.

In treating a cloth such as woven, knitted and non-woven cloths continuously on an industrial scale, for instance, in dyeing a cloth, it is necessary on the one hand to subject the cloth prior to the treatment to a process of scouring for removing water-repellent foreign matters adhering to the fibers of the cloth or for making the fibers hydrophilic so as to easily permeate the dye solution into the cloth, and on the other hand to subject the cloth to a finishing process after the treatment for applying such final properties as water repellency, static prevention, staining prevention and water absorption to the cloth. All of these processes have been conventionally done in a water system.

In these conventional treating processes, a large amount of fuel is necessitated, and further a large number of washing machines are needed for removing residual solution, foreign matters and matters adhering to the cloth and a large amount of water resource is needed for supplying water to the washing machine in the case of scouring, and still further an apparatus for abolishing the drained solution is needed. Under the above conditions, expenses are great in the treatment of a cloth, particularly for a water resource, heat energy and installation cost. Moreover, since the drained solution discharged from the washing machine unavoidably contains chemicals, there is a danger of public pollution, and large installation cost and personnel expenses are unavoidable therefor. Thus, the scouring and finishing processes are inferior economically in the textile processing industry.

Under such circumstances, it has been recently proposed to subject a textile product such as a cloth to a treatment in a low temperature plasma atmosphere for increasing such effects as desizing, scouring and finishing. In such a low temperature plasma treatment of a cloth, however, it is well known that when the distribution of low temperature plasma in the atmosphere thereof is not uniform in the cloth passage of the reaction chamber, the low temperature plasma treatment of a cloth becomes unavoidably uneven. A conventionally proposed electrode for generating low temperature plasma comprises a pair of flat electrode plates provided in parallel for generating low temperature plasma in uniform distribution, and a high frequency potential difference is applied between the two electrode plates for passing a cloth to be treated through the low temperature plasma thus generated. However, it is difficult to hold such a pair of flat electrode plates in parallel. Particularly, in the case of a flat electrode plate in a wide form corresponding to a wide cloth, it is impossible to hold a pair of such electrode plates in parallel due to the bending of the electrode plate caused by its own weight. It is considered to annex a supporting stay to a part of the electrode plate for preventing the bending of the flat electrode plate in a wide form, but, in a case when a projection such as a supporting stay exists at a part of the electrode plate, spark discharge is caused to occur partially, causing unevenness of the low temperature plasma density and further lowering the generating power.

OBJECT AND SUMMARY OF THE INVENTION

Accordingly, the object of the present invention is to offer an electrode plate for generating low temperature plasma in which it is possible to maintain a pair of the electrode plates in parallel by preventing the bending of the electrode plate for generating low temperature plasma between a pair of the electrode plates uniformly all over the electrode, and further for preventing the overheating of the material to be treated and the electrode plates effectively.

The present inventive electrode plate comprises, in principle, a plurality of long electrode plate members with the same form, a plurality of cooling water passages, which serve simultaneously as supporting members, for connecting each pair of the adjacent electrode plate members respectively along their longitudinal direction on both sides of the cooling water passage so as to arrange the adjacent electrode plate members alternately up and down in parallel with no formation of a projection, and cooling water communicating pipes provided outside the electrode plate members.

By arranging a pair of the present inventive electrode plates in such a way that the corresponding parts of the electrode plates fall up and down in parallel, the distance between the two electrodes becomes always constant. In suplying high frequency electric current to the electrode plates by connecting one of the electrode plates to a high frequency current oscillator and earthing the other electrode plate, low temperature plasma is generated uniformly and effectively all over the electrode plates. In applying the present inventive electrode plate for the treatment of a cloth, the cloth to be treated is transported continuously through the space between the two electrode plates. Such treatment as desizing, scouring and finishing of a cloth can be done uniformly and effectively due to the effect of the low temperature plasma thus generated, and thus the object of the invention can be attained eminently.

DETAILED DESCRIPTION OF THE INVENTION

The present invention will be described in detail in the following with reference to the drawings showing the examples of the inventive electrode plate.

Figure 1:
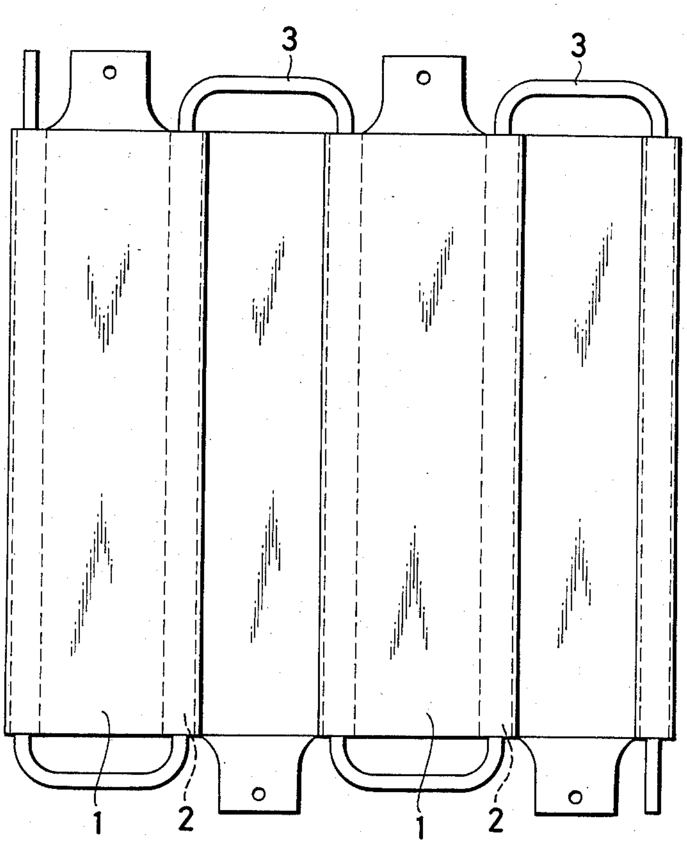
FIG. 1 is a plane view of an example of the present inventive electrode plate.
Figure 2:
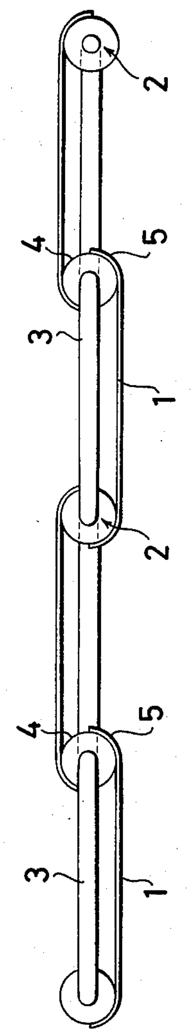
FIG. 2 is its side view.

An example of the present inventive electrode plate is as shown in FIGS. 1 and 2. In the figures, 1 represents a plurality of long electrode plate members with the same form for constructing an electrode plate, 2 represents a plurality of cooling water passages which serve simultaneously as supporting members, and 3 represents a plurality of cooling water communicating pipes provided outside of the electrode plate members. The cooling water passage 2 comprises a cylindrical pipe 4 in this example.

A plurality of cylindrical pipes 4, which serve as cooling water passage and supporting members simultaneously, are provided in parallel at regular intervals, each of the electrode plate members 1 is arranged along its longitudinal direction between the two cylindrical pipes 4, and an electrode plate member and a cylindrical pipe are fixed by welding. In order to prevent the formation of projection at the connecting part of an electrode member and a cylindrical pipe 4, each of the two edge parts of the electrode plate member 1 is bent so as to form a curved surface of ¼ circular arc 5 as shown in FIG. 2 for fixing the edge part to about one-fourth circumference of the cylindrical pipe by welding. In this way, the electrode plate members 1 are laid alternately up and down in parallel by putting each one of the cylindrical pipes 4 between the adjacent electrode plate members with no formation of a projection, and thus an electrode plate is constructed as a whole.

The construction of an example of the present inventive electrode plate for generating low temperature plasma is as above described. Now, its function will be explained in the following.

Figure 3:
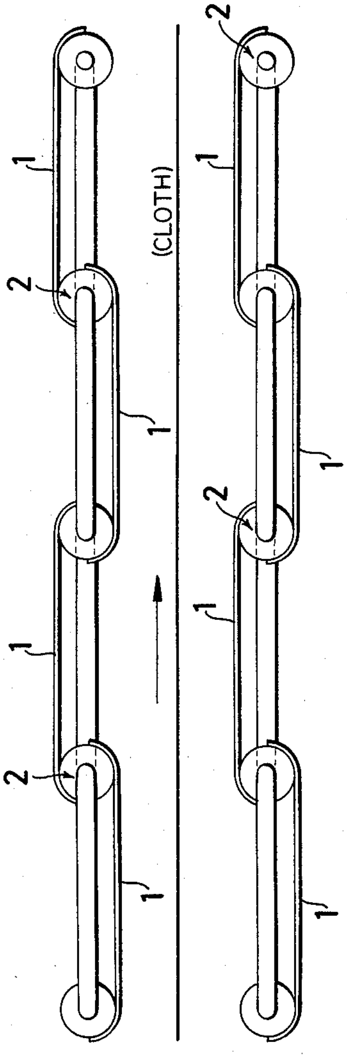
FIG. 3 is a side view to illustrate the state of use thereof.

In the continuous treatment of a cloth, a pair of electrode plates are arranged, as shown in FIG. 3, up and down in parallel with a prescribed distance therebetween so as to make the distance between the corresponding electrode plate members 1 become equal, and a cloth soaked with a treating solution such as a scouring solution is passed through said space continuously in the direction as shown with an arrow in the figure. The two electrode plates may of course be placed in vertical posture. The thus provided electrode plates are placed in a reduced pressure chamber (vacuum chamber) (not shown in the figure), and high frequency electric current is applied between the two electrode plates for forming low temperature plasma.

Figure 5:
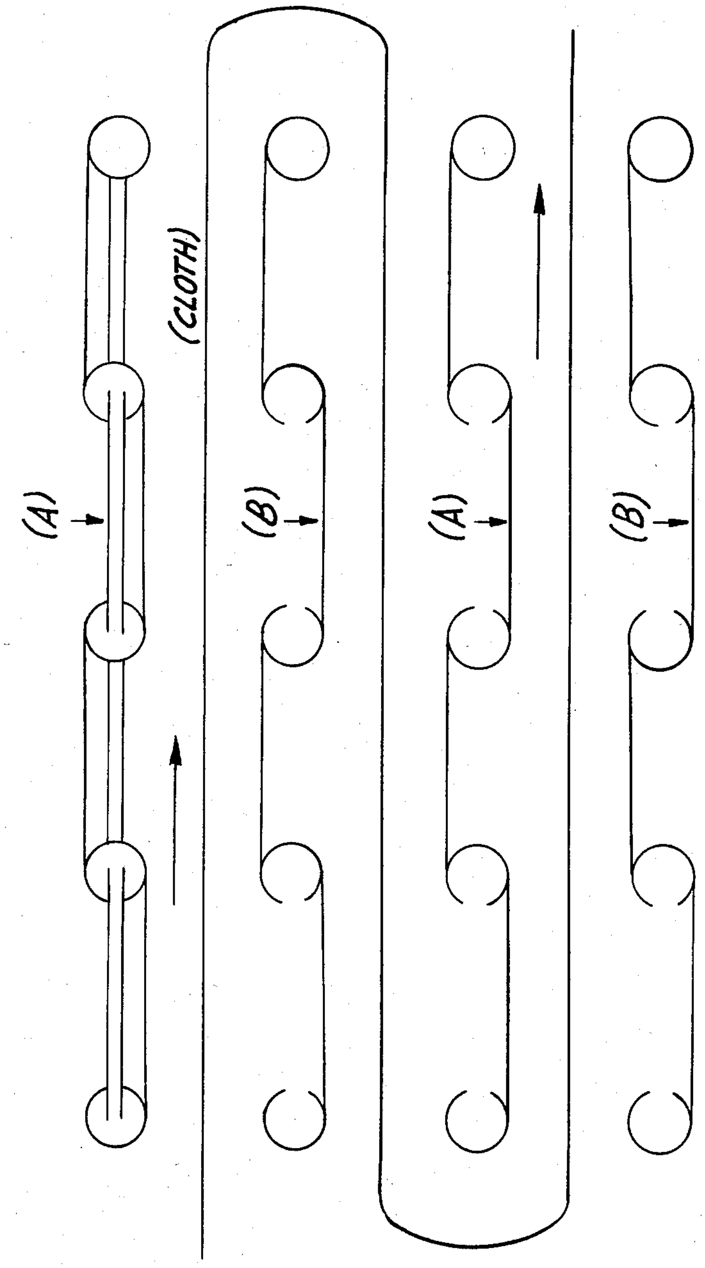
FIG. 5 is a side view of another example of the state of use thereof.

The cylindrical pipe 4 for forming a cooling water passage simlutaneously serves the role of a suporting member, so that the electrode plate is neither bent nor deformed, and it is possible to ensure the parallelism between the corresponding electrode plate members 1. Since the edge part of each of the electrode plate members 1 are bent so as to form a circular arc 5 for preventing the formation of projection between the opposing electrode plate members, there is no danger of the occurrence of spark discharge partially between the two electrode plates. While the distance between the two electrode plates is somewhat narrow at the position of the cooling water passages 2 and the quantity of the low temperature plasma generated may be shifted to some extent thereby. However, since the cloth is passed in its lengthwise direction as as shown with an arrow in FIG. 3, the distance between the two electrode plate members is always uniform in the width direction of the cloth, and consequently the quality of the plasma applied to the cloth in total in the course of its treatment is practically uniform. Moreover, since each of the cylindrical pipes 4 is connected to the electrode plate members 1, it is possible to cool the electrode plate effectively by passing cooling water through the cylindrical pipes 4 serving as the cooling water passages, and consequently there is no danger that the electrode plate is deformed by heating, and it is possible to generate low temperature plasma uniformly allover the electrode plate. In this way, continuous treatment of a cloth such as desizing, scouring and finishing can uniformly and effectively be done with the use of the present inventive electrode plate for generating low temperature plasma. In practical use, it is beneficial to arrange a plurality of electrode plates, alternately serving as an electrode for generating plasma (A) and an earth electrode (B), and to transport a cloth therebetween successively as shown in FIG. 5. Low temperature plasma generated on both sides of the electrode plates can effectively be utilized for the treatement of the cloth and both sides of the cloth can uniformly be treated with the plasma.

Figure 4:
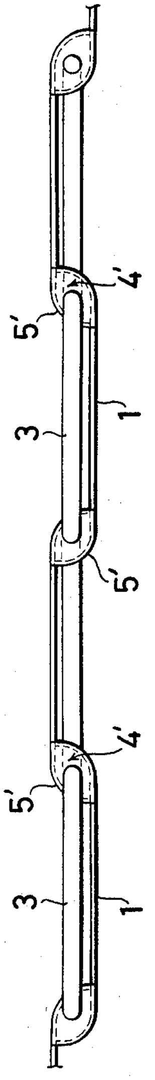
FIG. 4 is to show a side view of a modification of the electrode plate in the above.

In FIG. 4, a modification of the above mentioned electrode plate is shown. In this example, the cooling water passage 2, which is to serve simultaneously as a supporting member, comprises, instead of a cylindrical pipe 4 in the above, a hollow space 4' formed by bending the end parts of a pair of the adjacent electrode plate members 1 along their longitudinal direction in the opposite directions each other as shown with 5' in the figure and fixing both ends thereof by welding. The function of this hollow space 4' is the same as in the cylindrical pipe 4 in the preceding example. The construction of the other parts of the electrode plate and the function of the electrode plate in this example are the same as in the preceding one and low temperature plasma can uniformly be generated with the use of a pair of the electrode plate members also in this example.

We claim:

1. In an apparatus for treating cloth, said apparatus having at least two spaced electrode plates for use in generating a low temperature plasma, said electrode plates having a long dimension in which the cloth to be treated passes between said spaced electrode plates, said electrode plates including a plurality of electrode plate members having the same shaped configuration and arranged serially in the long dimension of said electrode plates, a plurality of cooling water passages extending transversely of the long dimension of said electrode plates, and for supporting and interconnecting each pair of serially adjacent said electrode plate members, each water passage having an outside surface with a first portion of said outside surface being closer relative to the path of travel of the cloth between two said electrode plates and a second portion of said outside surface being more remote relative to the path of travel of the cloth, and serially adjacent said electrode plate members being inverted relative to one another so that first ones of said electrode plate members extend between the first portions of the outside surfaces of said cooling water passages and second said electrode plate members extending between the second portions of the outside surfaces of said cooling water passages with said first and second electrode plate members being disposed in spaced parallel relation between said cooling water passages, and cooling water communicating pipes interconnecting said cooling water passages laterally outwardly from said electrode plate members.

2. In an apparatus for treating cloth, according to claim 1, wherein said cooling water passages each comprise a cylindrical pipe and the ends of said electrode plate members spaced apart in the long dimension of said electrode plate being supported on and extending along a ¼ circular arc on the circumference of said cylindrical pipe whereby in section in the long dimension of said electrode plate said electrode plate members have a channel-shaped configuration.

3. In an apparatus for treating cloth, according to claim 1, wherein said electrode plate members have a channel-shaped configuration in section in the long dimension of said electrode plates and said electrode plate members being in overlapping relation in the long dimension of said electrode plates and the overlapping said electrode plate members forming a hollow space defining said cooling water passage.

* * * * *